US009611062B2

(12) United States Patent
Palmisano et al.

(10) Patent No.: US 9,611,062 B2
(45) Date of Patent: Apr. 4, 2017

(54) METHOD AND DEVICE FOR APPLICATION OF A LABEL TO AN OBJECT

(71) Applicant: ALEVAX AB, Malmo (SE)

(72) Inventors: Francesco Palmisano, Malmo (SE); David Sanches Molinero, Malmo (SE)

(73) Assignee: ALEVAX AB, Malmo (SE)

( * ) Notice: Subject to any disclaimer, the term of this patent is extended or adjusted under 35 U.S.C. 154(b) by 0 days.

(21) Appl. No.: 14/403,871

(22) PCT Filed: May 31, 2013

(86) PCT No.: PCT/SE2013/000089
§ 371 (c)(1),
(2) Date: Nov. 25, 2014

(87) PCT Pub. No.: WO2013/180617
PCT Pub. Date: Dec. 5, 2013

(65) Prior Publication Data

US 2015/0107751 A1 Apr. 23, 2015

Related U.S. Application Data

(60) Provisional application No. 61/742,660, filed on Aug. 16, 2012.

(30) Foreign Application Priority Data

Jun. 1, 2012 (SE) ....................................... 1230057

(51) Int. Cl.
*B32B 41/00* (2006.01)
*B65C 9/18* (2006.01)
(Continued)

(52) U.S. Cl.
CPC ............ *B65C 9/1869* (2013.01); *B65C 1/025* (2013.01); *B65C 9/02* (2013.01); *B65C 9/46* (2013.01);
(Continued)

(58) Field of Classification Search
CPC ..... B65C 9/1869; B65C 1/021; B65C 9/0006; B65C 9/42; B65C 11/00; B65C 1/02; B65C 2009/0093
(Continued)

(56) References Cited

U.S. PATENT DOCUMENTS 4,267,004 A 5/1981 Anderson
5,893,263 A * 4/1999 Matsumoto et al. ......... 156/387
(Continued)

FOREIGN PATENT DOCUMENTS

CN 1724265 A 1/2006
CN 101537897 A 9/2009
(Continued)

OTHER PUBLICATIONS

International Preliminary Report on Patentability from PCT/SE2013/000089, issued Oct. 25, 2013, pp. 1-7.
(Continued)

*Primary Examiner* — Michael N Orlando
*Assistant Examiner* — Joshel Rivera
(74) *Attorney, Agent, or Firm* — Moser Taboada

(57) ABSTRACT

A method and a device for application of a label to an object, comprising: moving the object from a storing position to a labeling position; back-feeding and printing a label arranged at a continuous liner; moving the liner across a peeling edge, whereby the label is peeled off from the liner; transferring the label from the liner to the object; and removing the object from the labeling position to a removal position.

20 Claims, 13 Drawing Sheets

(51) Int. Cl.

| | |
|---|---|
| ***B65C 9/02*** | (2006.01) |
| ***B65C 1/02*** | (2006.01) |
| ***B65C 9/46*** | (2006.01) |
| ***B65C 11/02*** | (2006.01) |
| *B65C 9/00* | (2006.01) |

(52) U.S. Cl.
CPC .. *B65C 11/0289* (2013.01); *B65C 2009/0084* (2013.01)

(58) Field of Classification Search
USPC ......... 156/64, 152, 192, 249, 350, 378, 379, 156/387, 760, 542
See application file for complete search history.

(56) References Cited

U.S. PATENT DOCUMENTS

| | | | |
|---|---|---|---|
| 6,187,128 | B1 | 2/2001 | Oosterlinck |
| 6,871,850 | B1 | 3/2005 | Lenkl |
| 2002/0084014 | A1 | 7/2002 | Klein et al. |
| 2003/0227528 | A1 | 12/2003 | Hohberger et al. |
| 2006/0162842 | A1 | 7/2006 | Hiroike et al. |
| 2008/0283179 | A1 | 11/2008 | Sink |

FOREIGN PATENT DOCUMENTS

| | | | |
|---|---|---|---|
| DE | 2555910 | | 6/1977 |
| EP | 0 361 693 | A2 | 4/1990 |
| EP | 1 447 333 | A1 | 8/2004 |
| GB | 1113685 | | 5/1968 |
| JP | H09156623 | A | 6/1997 |
| WO | 2006030456 | | 3/2006 |

OTHER PUBLICATIONS

International Search Report from PCT/SE2013/000089, issued Oct. 25, 2013, pp. 1-5.

Written Opinion from PCT/SE2013/000089, issued Oct. 25, 2013, pp. 1-6.

Chinese Office Action, dated Jun. 30, 2016, for Application No. 201380039632.2.

Extended European Search Report dated Dec. 21, 2015 for Application No. 13796623.0.

* cited by examiner

METHOD AND DEVICE FOR APPLICATION OF A LABEL TO AN OBJECT

FIELD OF INVENTION

This invention relates to a method and a device for automatically applying a label onto an object, such as a microscope slide or on a tissue cassette.

BACKGROUND

Labeling of small objects is important for logistics and for traceability. In a laboratory, which requires the preparation of a big number of samples with great accuracy, a small labeling machine is needed, which is able to fit on a standard working table. The machine should operate with minimum noise or vibrations and allow easy change of the labels and the thermal transfer ribbon. A typical application of such a machine is a medical laboratory, where there is the need to label objects, such as microscope slides and tissue cassettes. Today, these steps are mostly carried out by hand, causing a significant waste of time and risk for errors.

GB1113685A discloses a labeling device for facilitating accurate labeling of microscope slides using self-adhesive labels. The device is operated by hand, using pre-printed labels.

U.S. Pat. No. 6,187,128 B2 discloses a labeling apparatus for converting base label stock to releasably-lined labels. The apparatus includes a vacuum anvil roller and an idler roller, which cooperate to separate the base stock into its face web and backing liner components. A cutting roller cooperates with the vacuum anvil roller to butt cut the unlined face web to form butt cut labels. A traction nip roller cooperates with the vacuum anvil roller to press the butt cut labels to the backing liner to form the releasably-lined labels. The releasably-lined labels may be imprinted and the backing liner removed as the label is affixed to an article using conventional labeling equipment. A rewind nip roller cooperates with the traction nip roller to pull the backing liner, which is then rolled on a rewind mandril. The apparatus does not weaken or cut the backing liner during conversion to releasably-lined labels, because the butt cut is made after the face web is separated from the backing liner.

US20080283179A1 discloses a label printing station, which includes: a base; a label supply wheel rotatably mounted to the base for rotation about a first vertical axis of rotation; a label backing take-up wheel rotatably mounted to the base for rotation about a second vertical axis of rotation; and a label print-head assembly mounted to the base, the label print-head assembly being configured to print on a label as the label is vertically oriented. The supply wheel, the print-head assembly and the take-up wheel serially define a paper path along which a substantially continuous label backing sheet travels. The backing sheet may be supported from underneath at multiple locations along the paper path. With the printed label being vertically oriented, the label can be attached to an object, such as a vertically oriented pharmaceutical vial, which can simplify the labeling process.

Such previously known device, apparatus and station are relatively cumbersome and difficult to adapt to small objects. Thus, there is a need for an automatic labeling device, which may print labels at demand and automatically attach the labels to small objects such as a microscope slide or a tissue cassette.

SUMMARY OF THE INVENTION

Accordingly, an object of the present invention is to mitigate, alleviate or eliminate one or more of the above-identified deficiencies and disadvantages singly or in any combination.

In an aspect, there is provided a method of application of a label onto an object, comprising: moving the object from a storing position to a labeling position by a first actuator driven by a motor; back-feeding and printing a label arranged at a continuous liner; moving the liner across a peeling edge by a second actuator driven by a motor, whereby the label is peeled off from the liner; moving the object below the peeling edge and synchronous with the liner by the first actuator, whereby the relative speed of the object and the label being peeled off from the liner is substantially zero in order to transfer the label from the liner to the object; and removing the object from the labeling position to a removal position.

In an embodiment, the step of moving the object from the storing position to the labeling position may be performed during or after the printing of the label. In another embodiment, the method may further comprise: sensing that the object to be labeled is positioned in the labeling position before the printing and peeling steps. In a further embodiment, the method may further comprise: sending data to be printed on one or several labels to a memory of a label printer before the printing step. In a still further embodiment, the back-feeding step may be performed during or after removal of the object. In a yet further embodiment, the continuous liner may be stretched before or after the printing step. The stretching of the liner may result in removal of the object.

In another aspect, there is provided an apparatus for performing the above method for application of a label to an object, comprising: a storage for enclosing several objects to be labeled; a transport device comprising a first actuator driven by a motor for moving each object from a storing position to a labeling position; a label printer arranged to back-feed and print information on a label arranged at a continuous liner; a feeding device comprising a second actuator driven by a motor for feeding the liner across a peeling edge, whereby the label is peeled off from the liner; whereby the transport device is arranged to move the object below the peeling edge and synchronous with the liner, so that the relative speed of the object and the label being peeled off from the liner is substantially zero in order to transfer the label from the liner to the object; and a removal device for removing the labeled object from the label position to a removal position.

In an embodiment, the device may further comprise: a sensor arranged to determine when an object is positioned in a correct position for receiving a label when peeled off from the liner. In addition, the first actuator may comprise: several rollers or a transport band or a movable arm arranged to interfere with a single object at a time, in order to transport the single object to the labeling position. The device may further comprise a roller which is arranged to transport the object and at the same time exert pressure on the label attached to the object in order to further attach the label to the object.

The object may be a microscope slide or a cassette.

The device may in another embodiment further comprise a guide arranged above the peeling edge so that the liner with attached label is arranged to pass between the guide and the peeling edge. In addition, the device may further comprise a stretching device including at least one roller driven by a motor and arranged to act upon the liner after the peeling edge to stretch the liner. A roller may be arranged on a pivotable arm and may be arranged to be pivoted during said stretching of the liner in order to push out an object.

In a still further embodiment the device may comprise a printer including; a storage for a liner provided with labels; a printer head; a peeling edge; and a roller driven by a motor for feeding the liner and label to the printer head for printing information on the label and for feeding the liner and label to the peeling edge to peel off the label from the liner. The device may further comprise an object device including: said storage for storing several objects to be provided with labels; said transport device for moving the object to a labeling position; a sensor device for sensing when an object is in a correct labeling position: a stretching device for stretching the liner after the peeling edge; and said removal device.

The printer may comprise a first control device for operating the printer and wherein the object device comprises a second control device for operating the object device, which second control device is controlled by the first control device, and wherein information for printing a label is only delivered to the first control device. The information may be sent to the first control device by a barcode reader, an electronic scale or a personal computer. The second control device may be arranged to command the said first control device to issue one single label at the time.

The object device may command the printer to issue one single label at a time within a working cycle, after or while data is being sent to printer's memory.

BRIEF DESCRIPTION OF THE DRAWINGS

Further objects, features and advantages of the invention will become apparent from the following detailed description of embodiments of the invention with reference to the drawings, in which.

DETAILED DESCRIPTION OF EMBODIMENTS

Below, several embodiments of the invention will be described. These embodiments are described in illustrating purpose in order to enable a skilled person to carry out the invention and to disclose the best mode. However, such embodiments do not limit the scope of the invention. Moreover, certain combinations of features are shown and discussed. However, other combinations of the different features are possible within the scope of the invention.

Figure 1:
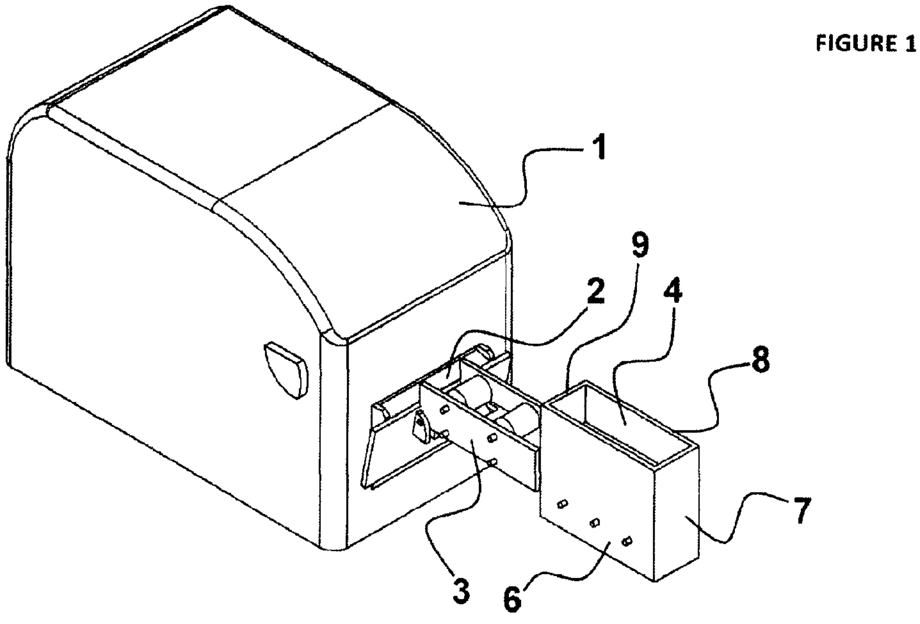
FIG. 1 is a schematic perspective view of a first embodiment of the labeling device.
Figure 2:
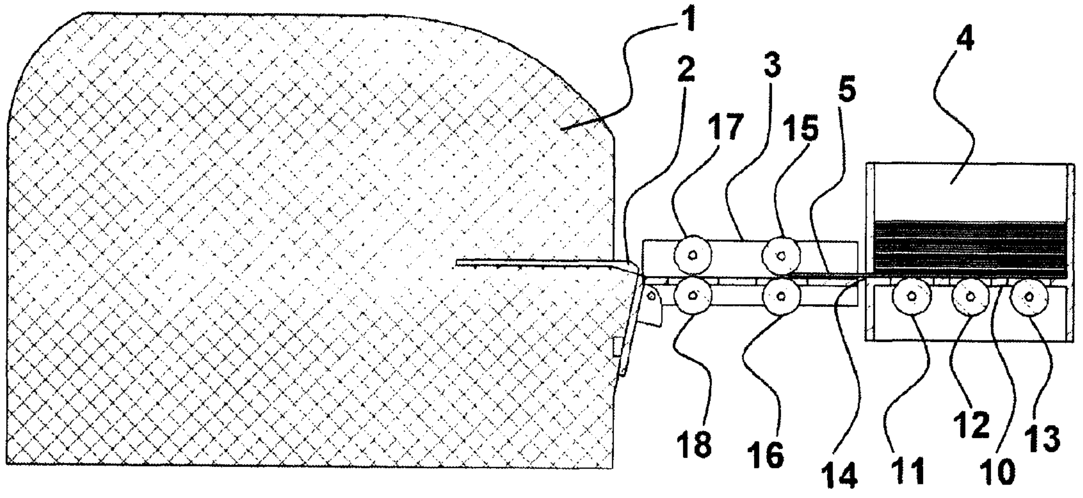
FIG. 2 is a side view partly in section of the embodiment according to FIG. 1 in a first position.
Figure 3:
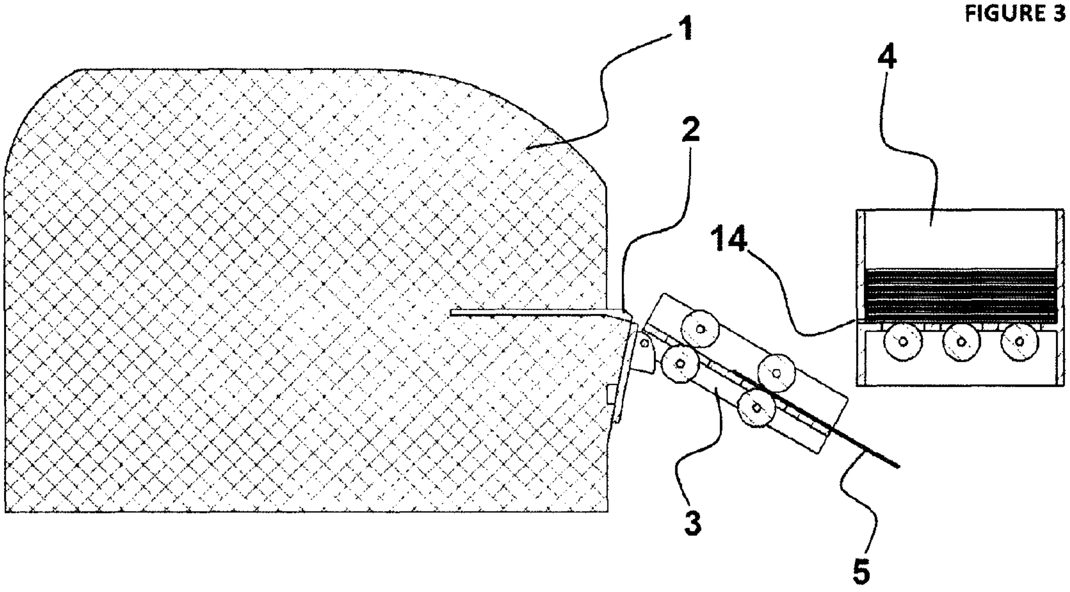
FIG. 3 is a side view of the embodiment according to FIG. 1 in a second position.

FIG. 1 is a perspective view and shows an apparatus for labeling an object in a first embodiment. FIG. 2 shows the apparatus according to FIG. 1 in a feeding position, while FIG. 3 shows the apparatus in a releasing position.

As shown in FIG. 1, a storage container 4 is arranged to enclose a stack of objects 5, such as microscope slides or tissue cassettes. The storage container is placed in line with a movable ramp 3. One object 5 at a time is fed from the storage container 4 and to the ramp 3, and carried inside the ramp until the object is in a correct labeling position as shown in FIG. 2. The ramp 3 is connected to a printer 1 via a pivotable joint. The printer 1 is arranged to print a label and feed the label to a labeling position. An applicator 2 places the label on the object 5. After the object has been labeled, the ramp pivots to the position shown in FIG. 3 and releases the object 5.

Figure 4:
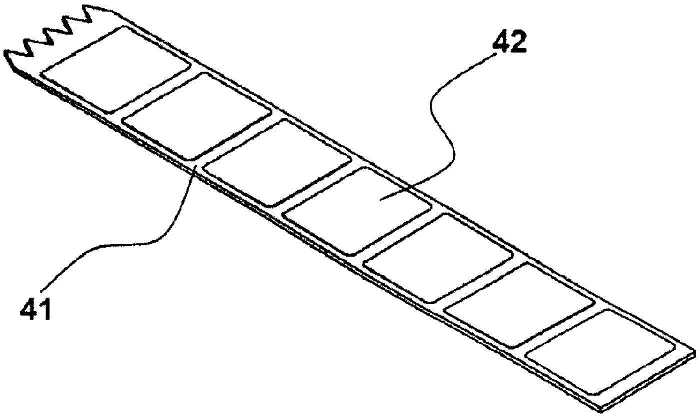
FIG. 4 is a perspective view of labels arranged at a label lining.

FIG. 4 shows an embodiment of a label strip comprising pressure sensitive self-adhesive labels, which can be made in different materials ranging from paper to plastic films. The label 42 has a backing adhesive (not shown) and a backing liner 41. The liner could be made from a layer of silicon-coated paper or silicon-coated plastic film. The task of the backing liner is to carry the labels in a roll or sheet and to prevent the labels from sticking onto each other. Silicon is used in order to make the adhesive staying on the label rather than on the backing liner.

A standard thermal transfer printer 1 may be used for printing information on the label. This printer uses an ink ribbon in order to impress an image and/or text on a receiving material (the label) by using a heated thermal head. This type of printer is available from several suppliers around the world, and is mainly used to print labels. Some printers comprise a peeling kit as a complement to the system. The function of the peeling kit is to separate a label from its backing liner. At the end of the separation process the label still adheres to a portion of a few millimeters of the backing liner and is hanging freely in the air. The label may be removed from the liner and applied to the object by hand. In order to have an automatic peeling and application of a label onto an object it is important to control several factors which could play an important role. These factors become critical especially when peeling and applying small labels, with length less or equal to 1 inch (25.4 mm). The two most important factors are the bending radius and the tension of the backing paper across the peeling edge.

FIG. 1 shows that the storage container 4 comprises four walls 6, 7, 8, 9, which delimits a space, which has a size so that the space can accommodate the objects 5. As shown in FIG. 2, the container has a bottom wall 10, which comprises three rectangular openings. Three rollers 11, 12, 13 extend into said space via the openings. Thus, the rollers may engage with a lower object 5 of a pile of objects and move it from the bottom of the pile and to the left in FIG. 2. One such object is shown partially moved out trough a narrow slit 14, which is more clearly visible in FIG. 3. The slit 14 has such a dimension that it can deliver only one object at a time from the container 4.

When the object is moved out through the slit 14, further rollers 15, 16, 17, 18 grip the object and transport the object to a labeling position.

FIG. 3 shows the object 5 in a release position, in which the object has been provided with a label. The ramp 3 is pivoted down as shown and the rollers 15-18 move the object for release.

All the rollers may be driven. Alternatively, only some of the rollers, such as at least the rollers 11 and 16 are driven. The rollers 15 and 17 may aid in pressing the label onto the upper side of the object after application of the label.

The dimension of microscope slides is regulated by an ISO standard (ISO 8037-1:1986) and the standard size is about 25×75 mm, 1 mm thickness. Tissue cassettes have also standard sizes and may have the following dimensions: 28.5×41×6.7 mm. Thus the standard size of these objects allows the container 4 and the feeding arrangement to be adapted to the objects to be labeled in the device.

Figure 5:
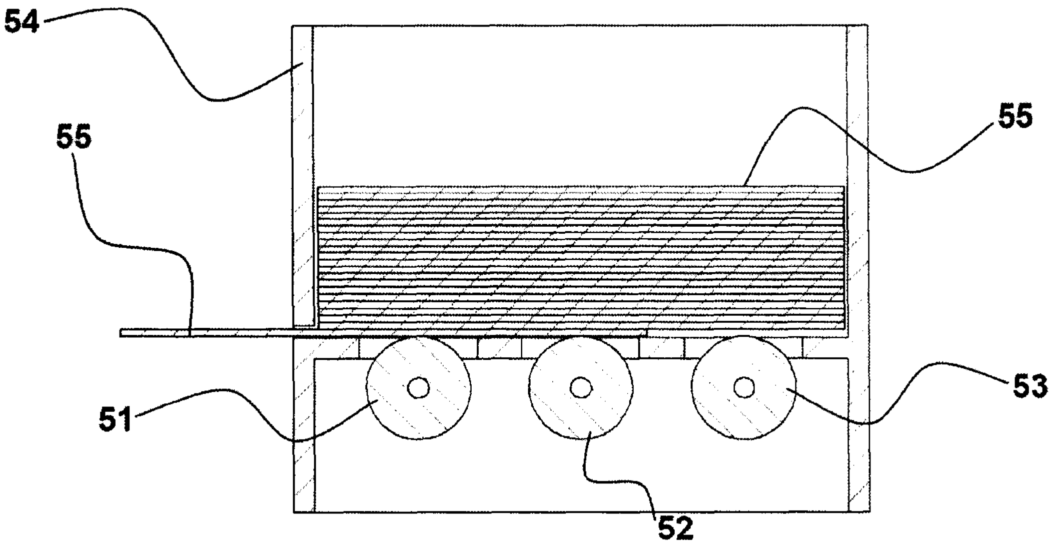
FIG. 5 is a cross-sectional view of a first embodiment of an object magazine to be used on the embodiment of the labeling machine.
Figure 6:
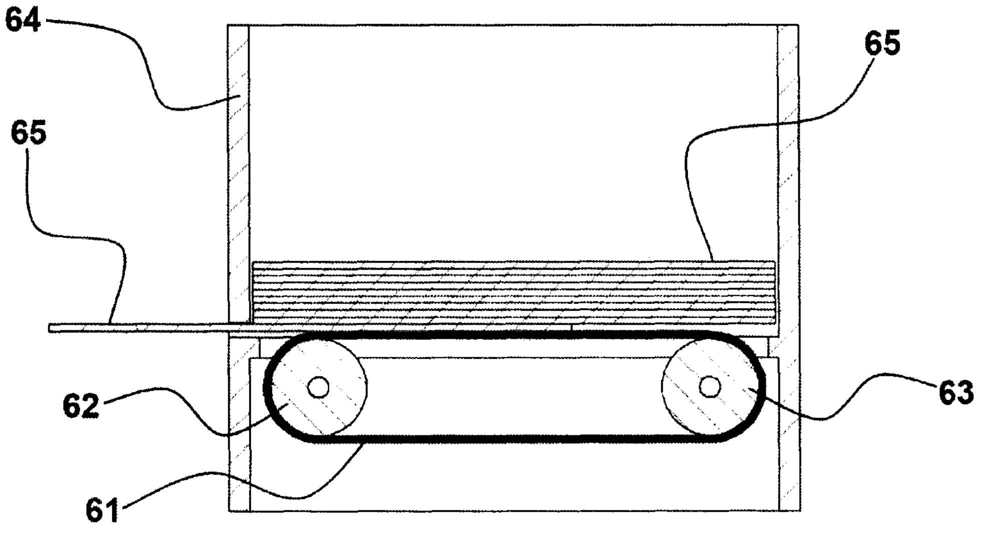
FIG. 6 is a cross-sectional view of a second embodiment of the object magazine.
Figure 7:
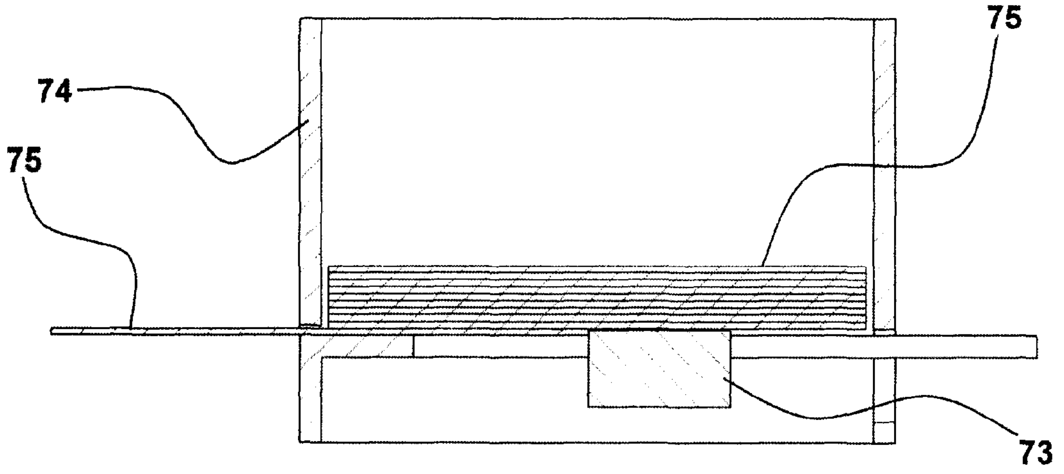
FIG. 7 is a cross-sectional view of a third embodiment of the object magazine.

Different methods may be used in order to feed an object out of the storage container. The embodiment shown in FIG. 5 uses several rollers 51, 52, 53, by which at least one is driven, for moving an object 55 out of the container 54. The configuration shown in FIG. 6 uses a transport band 61 and several rollers 62, 63, by which at least one is driven for moving an object 65 out of the container 64. The configuration shown in FIG. 7 uses a movable arm 73 in order to push out the object 75 from the container 74.

Figure 8:
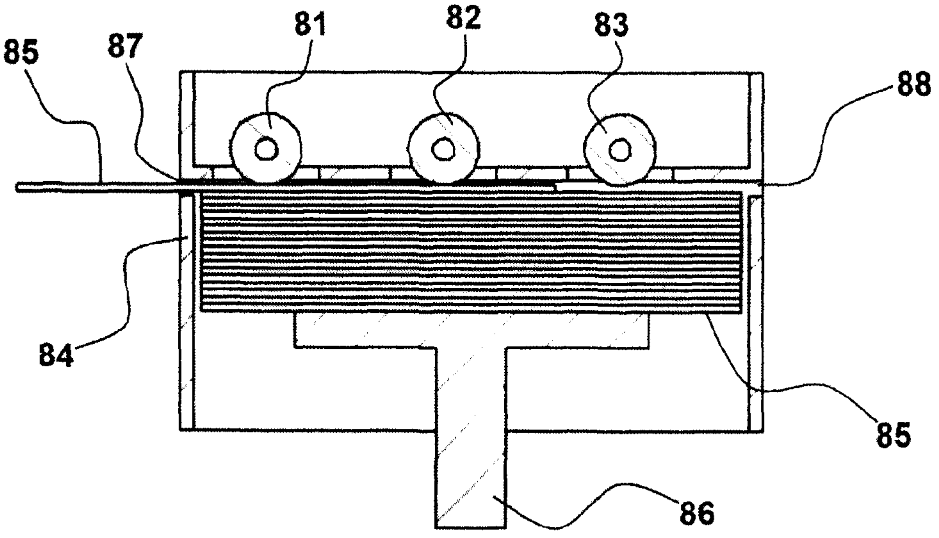
FIG. 8 is a cross-sectional view of a fourth embodiment of the object magazine.

FIG. 8 shows another method of feeding out the objects. The objects 85 are arranged in a pile at a support 86, which is moveable in the vertical direction by means of a spring (not shown). The top object of the pile of objects is urged against three rollers 81, 82, 83, at least one of which is driven. The top object may be fed out at least partly through a slit 87. Once the object has been labeled, it can be released through another slit 88, arranged at the back-side of the storage container. Thus the object can be released from the storage container itself after being labeled. In addition, the object may be pushed out of the storage container only as much as is required for labeling purpose, for example as shown to the left in FIG. 8 and then be retracted and pushed out in the other direction through slit 88. Alternatively, the object may be removed completely from the storage container and used in the same way as described with reference to FIG. 2.

Figure 9:
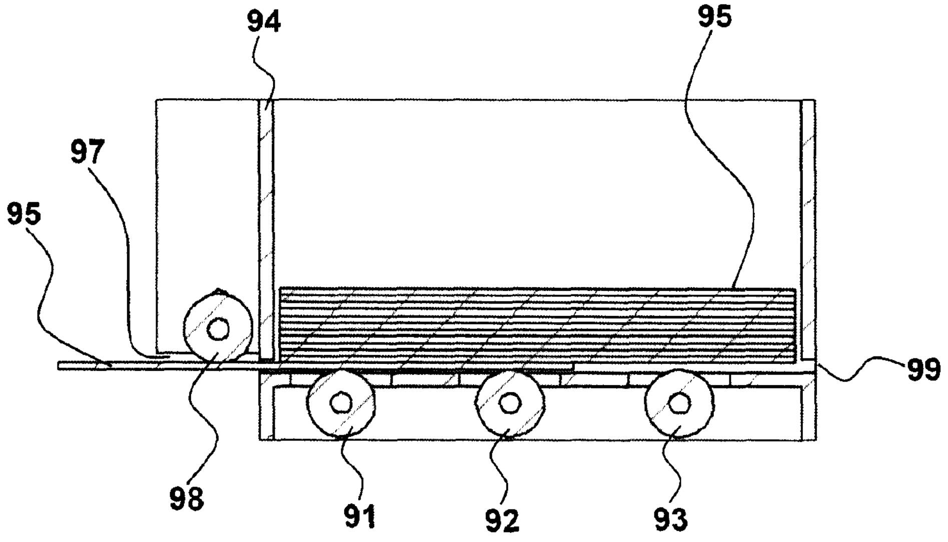
FIG. 9 is a cross-sectional view of a fifth embodiment of the object magazine.
Figure 10:
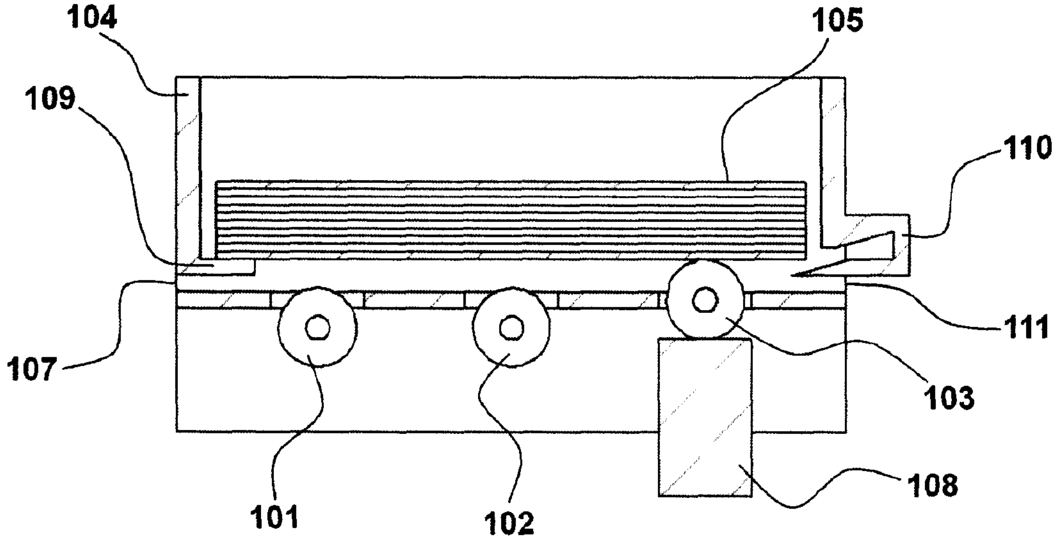
FIG. 10 is a cross-sectional view of a sixth embodiment of the object magazine.

FIG. 9 and FIG. 10 show other embodiments. FIG. 9 shows a configuration very similar to the one described in FIG. 5, with the difference that there is a slit 97, 99 in both of the walls. After being labeled, the object is slightly pressed down by roller 98, which combined with the backward movement of rollers 91, 92, 93 makes it possible for the object 95 to slide under the stack of other object while carrying a label. Without roller 98, the presence of the label may prevent that the object 95 could seamlessly slide backwards under the stack of objects for being released.

FIG. 10 shows an embodiment, in which there is a slit 107, 111 in both of the walls. A roller 103 is pushed up by a spring or a servo 108. Roller 103 moves the first object 105 in an opening 110, until the object falls down in contact with the rollers 101, 102. Roller 103 is then pushed down; object 105 is labeled being fed out of slit 107 in the frontal wall. Then rollers 101, 102, 103 move backwards in order to release the object from slit 111 in the back wall.

Other feeding methods as shown above can be used as alternatives.

In the FIGS. 5 to 10, the walls enclosing the objects can be substituted by a removable device such as a cartridge. The purpose of this device is to allow an easy charging of the objects, while preserving the function of the fixed walls. The said wall is wall 54 in FIG. 5, wall 64 in FIG. 6, wall 74 in FIG. 7, wall 84 in FIG. 8, wall 94 in FIG. 9 and wall 104 in FIG. 10

Figure 11:
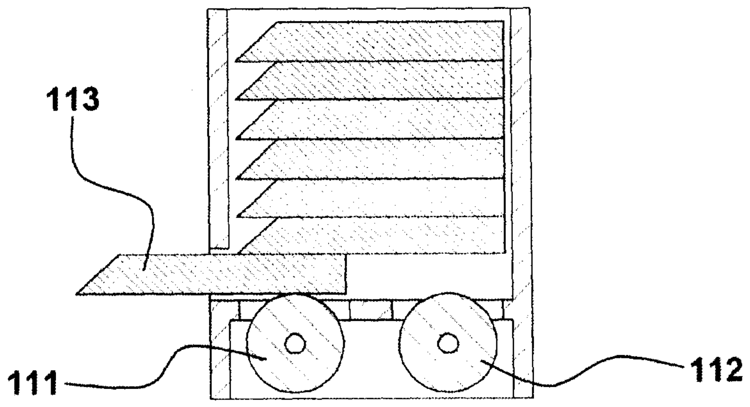
FIG. 11 is a cross-sectional view of a seventh embodiment of the object magazine, which is similar to the first embodiment but intended for another type of objects.

FIG. 11 shows a similar arrangement for a tissue cassette 113. FIG. 11 shows a feeding arrangement with rollers 111, 112. Other arrangements, as indicated above for microscope slides, can be used.

Figure 12:
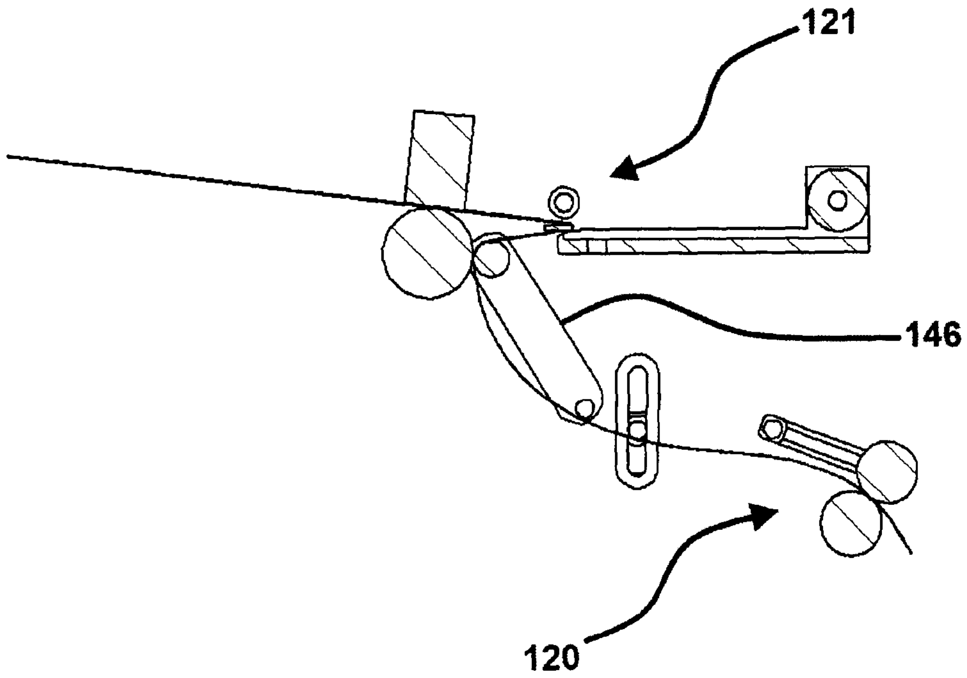
FIG. 12 is a cross-sectional side view of the object and label feeding mechanism according to a second embodiment of the labeling device.

FIG. 12 depicts the label peeling and application assembly 121 together with a liner tensing assembly 120. The assemblies will be described in detail with reference to FIG. 13 and FIG. 21.

Figure 13:
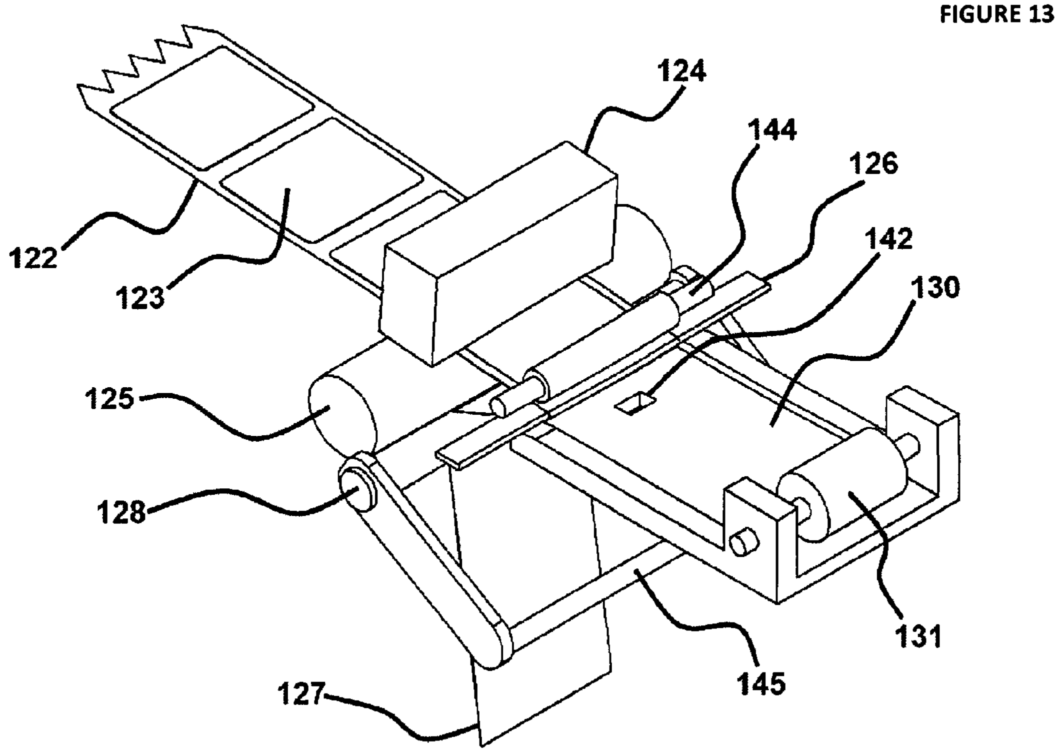
FIG. 13 is a detail perspective view similar to FIG. 12 but in more details.

Referring to FIG. 13, there is shown the label applicator 121 with all the parts used to place the label to the object. A strip 122 of labels 123 passes between a printer head 124 and a feed roller 125 driven by a step motor (not shown). A peeler edge 126 detaches labels from their backing paper 127 by bending the backing paper over almost 180 degrees. The backing paper 127 is then transported out using the movement of a roller 128 against the feed roller 125. The roller 128 is mounted onto a movable arm 146, which can rotate on a pivotable joint 145.

The object to be labeled is transported and guided on a backing plate 130 with a feeding system similar to the one described for the storage container. In FIG. 13, a driven top roller 131 is shown, which moves forward the object, such as a slide or a cassette, into position. Such roller could alternatively be placed at the bottom of the backing plate below the object, or in the sides or be substituted by a movable band or a movable arm. A sensor 142 can be used to detect the availability and/or the correct position of the object prior to labelling. A guide, such as a shaft or a roller 144 can be placed on top of the peeling edge to keep tension in the liner portion comprised between the printer head 124 and the roller 128. The roller 144 could be substituted by a plate or other means for obtaining the same effect.

The first label 143 in the sequence is normally not in a correct position for printing.

Figure 14:
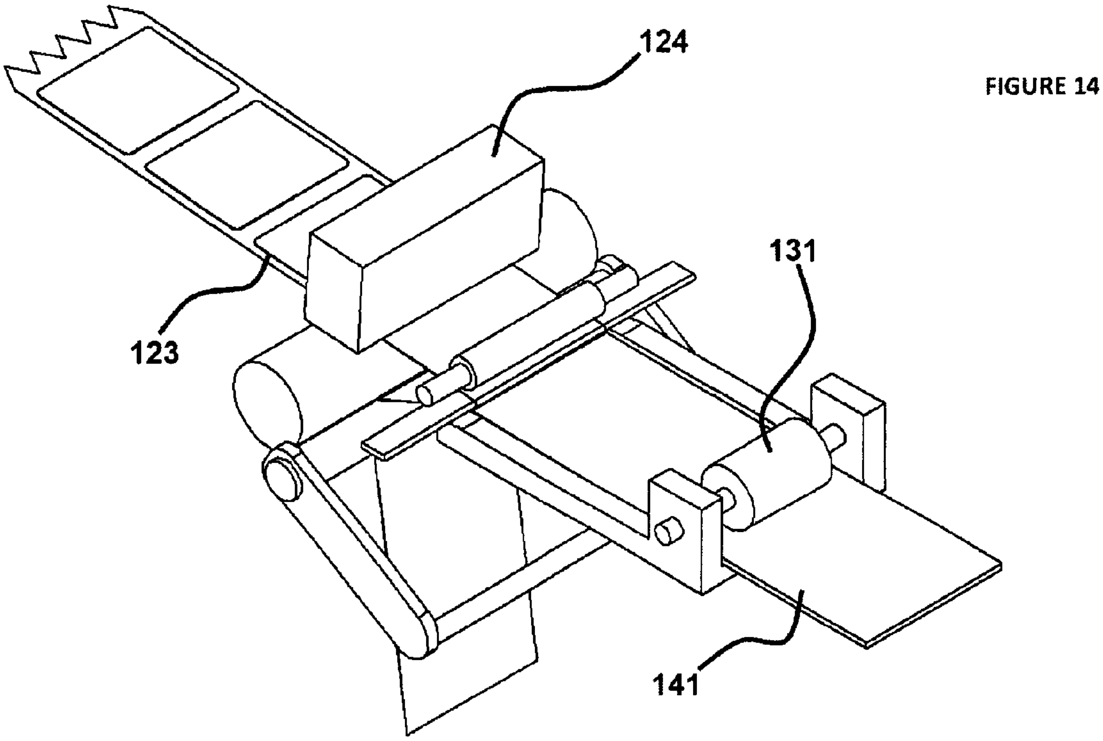
FIG. 14 is a detail view similar to FIG. 13 in a first position.

In FIG. 14, the object 141 is transported, in a first step, by using the roller 131 until it reaches the correct labeling position. A portion of the object is inserted under the peeling edge 126, so that the right edge of the label will be positioned at a desired position of the object. The roller 128 may act as a limit wall preventing the object 141 to move away from the labeling position. Other conventional position limiting devices may be used. The movement of the object to a labeling position is performed by one or several motors, which act upon one or several rollers, transport bands or pushing rod. The motor may be operated pneumatically or hydraulically, although an electrically driven motor is normally used. An apparatus control system blocks the printer and prevents the printer from producing new labels until the object is in the right position for labeling.

When the object has reached the labeling position, the printer performs a back-feed step, in order to transport the first non-printed label of the series of labels back into a printing position, immediately adjacent to the the printer head 124. This may be done by the apparatus control system and in this way it is possible to print labels one after the other without sacrificing any label. The back-feed step is performed by rotation of roller 125 in the counter-clockwise direction as seen in FIG. 14. This back-feed motion will cause slack in the liner 122 before or to the left of the printer head. Such slack may be absorbed by counter-rotation of a stock roller, which carries the stock of liner 122 to the left in FIG. 13. Alternatively, the slack is just left as it is, since it does no harm, see below.

Figure 15:
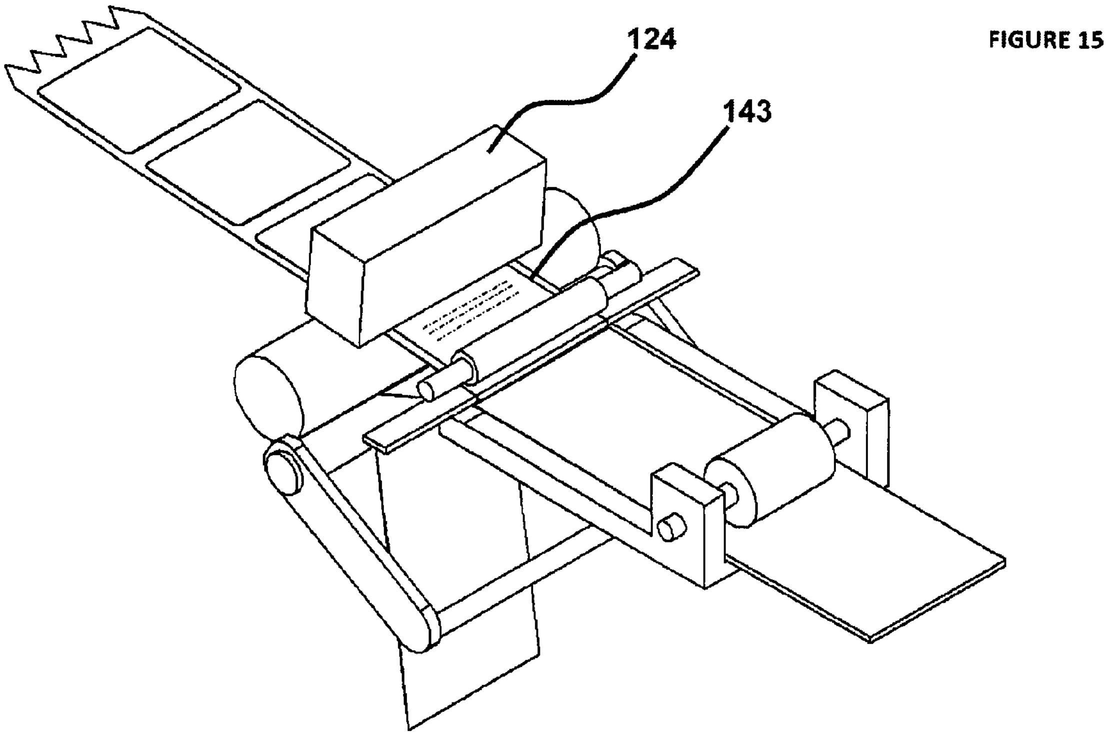
FIG. 15 is a detail view similar to FIG. 13 in a second position.

In FIG. 15, the label is moved under the printer head in the back-feed step and is printed to form a printed label 143 in a print step, when the roller 125 is moved in the clock-wise direction. During the print step, any slack in the liner 122 before the print head is used up and the liner 122 becomes stretched again.

During the back-feed step and the print step, the portion of the liner 122 arranged between the print head and the nip between rollers 125 and 128 has a constant length, since it is the roller 125 which determines the speed of movement at both positions. Thus, the portion of the liner 122 between the print head 124 and the peeling edge 126 is kept stretched all the time. However, if the liner 122 should slip, the liner 122 and the label 123 immediately after the print head is controlled by the guide roller 144, so that the newly printed label is safely transported to the peeling edge. The roller 144 can be replaced by a plate or several rollers if required.

Figure 16:
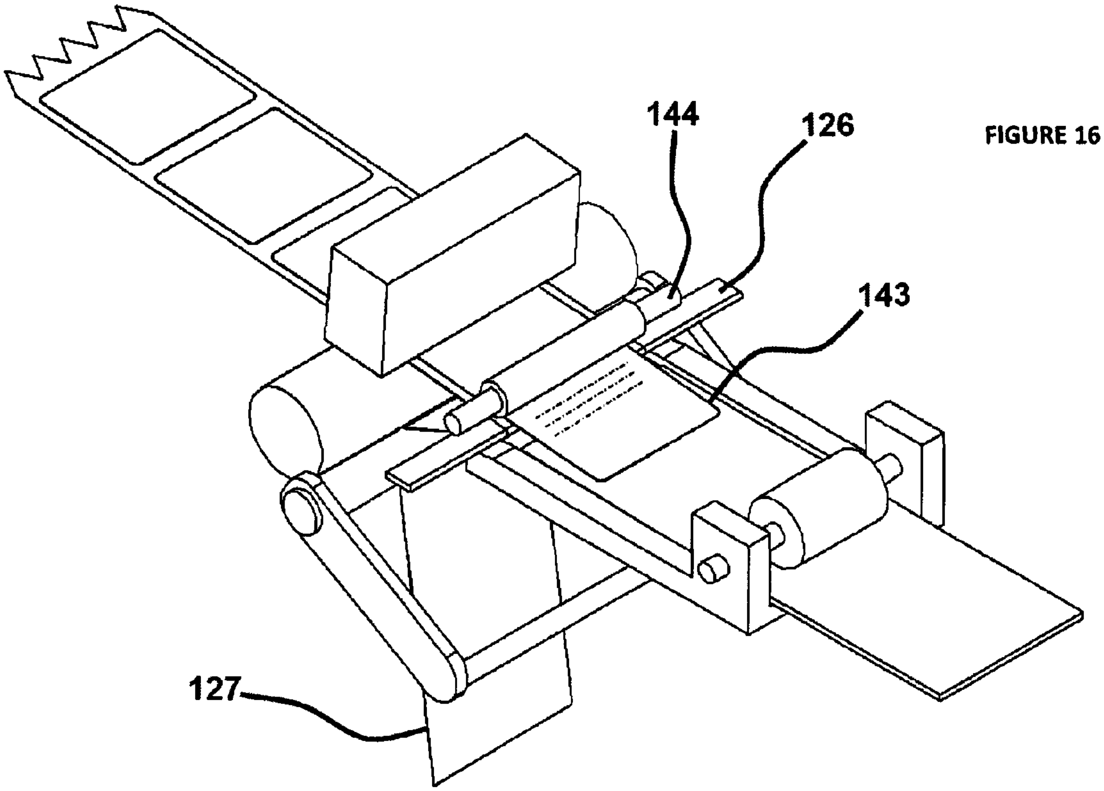
FIG. 16 is a detail view similar to FIG. 13 in a third position.

In FIG. 16 the printed label 143 is advanced on the peeling edge 126 until it peels off, which means that it is partially separated from its backing liner 127. The backing liner 127 is transported in forward direction, carrying the label with itself. The backing liner is then folded sharply over the peeling edge 126 while the label continues straight ahead. The roller 144 helps maintaining an optimal tension of the backing liner 127 during such movement.

The object is moved to the right in FIG. 16 with the same speed as the label 143 so that the contact point between the right side of the printed label 143 and the object is synchronized, which means that the relative speed between the label and the object is zero. When the label 143 has advanced about half its length out of the peeling edge to approximately the position shown in FIG. 16, the right edge of the label starts to move downwards into contact with the object. The exact position of the label 143 when moving downwards depends on such factors as the stiffness of the label, the stickiness of the adhesive to the liner 122 and other factors. Since the object is moved at the same speed as the label is advanced over the peeling edge, the exact time of contact with the object has no influence on the final result, since the right edge of the label will always be arranged at the same position of the object, as determined by the initial position.

Figure 17:
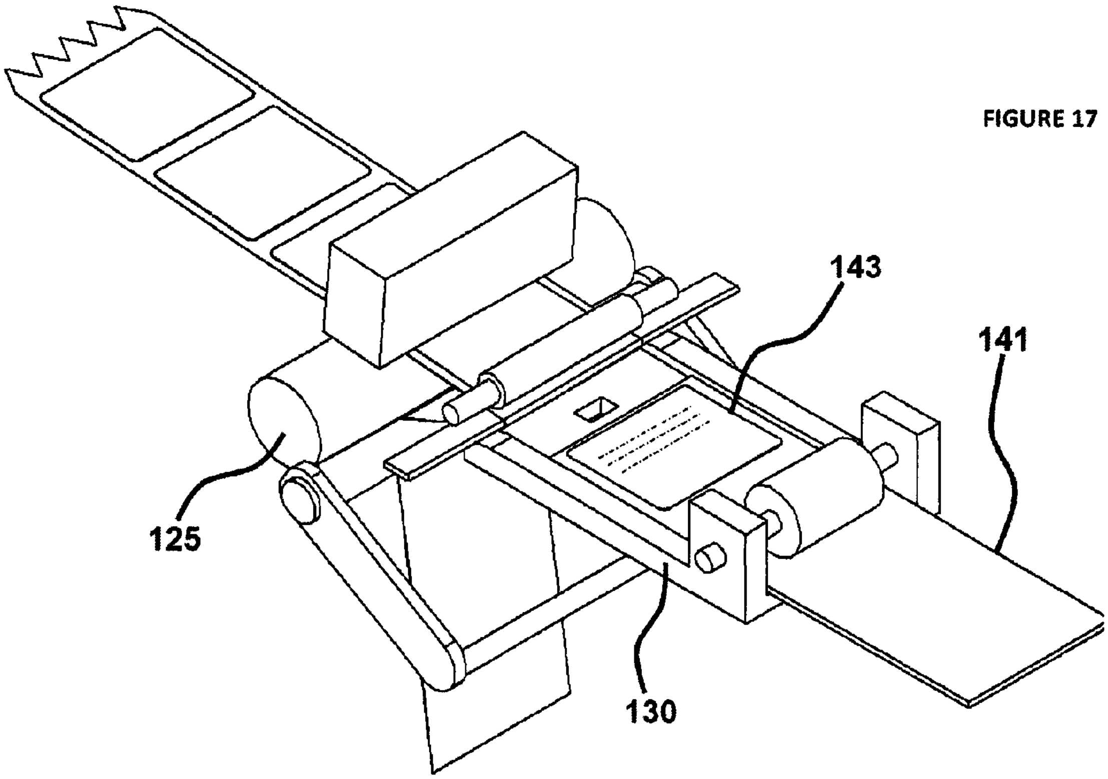
FIG. 17 is a detail view similar to FIG. 13 in a fourth position.

In FIG. 17 the label 143 is applied on the object 141, thanks to the rotation against the feed roller 125, the inclination and position of the backing plate 130 and the control operated on the printer by the apparatus control system. The roller 131 may press the label onto the object so that a complete sticking of the pressure-activated adhesive of the label to the object is obtained. After the label has been applied, the object is transported out and released by means of the roller 131.

The roller 131 may alternatively be arranged below the object. In this case, no press is needed on the label after application to the object, since the bending action during the peeling is sufficient for attaching the label to the object. In addition, the gravitational forces will contribute to the attachment force.

Figure 18:
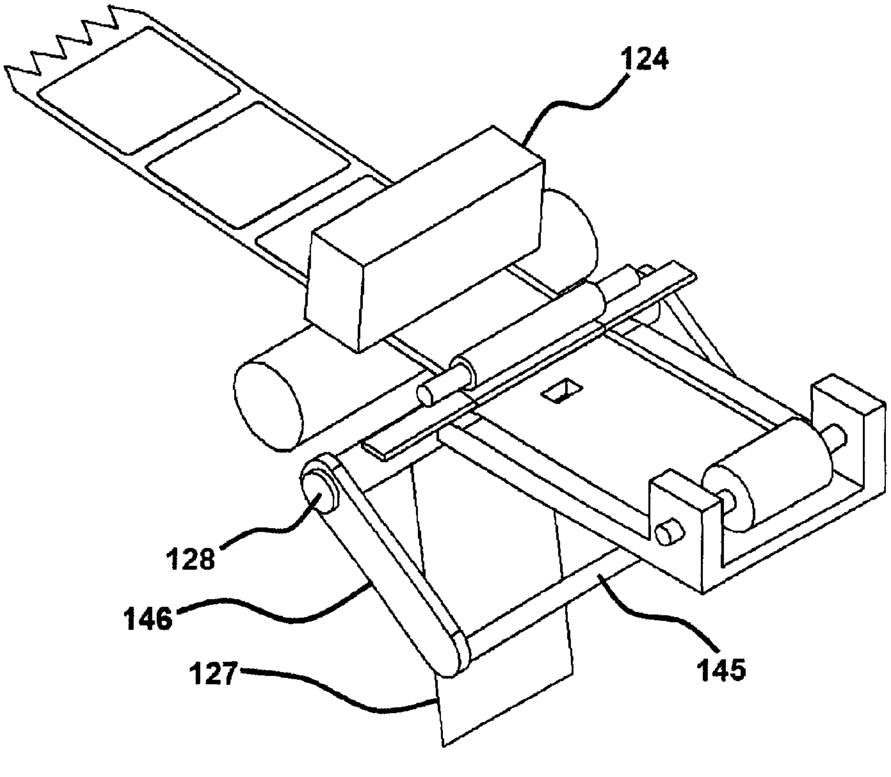
FIG. 18 is a detail view similar to FIG. 13 in a fifth position.

In FIG. 18 the object has been released, but the liner 127 could have lost tension during the process. It is important to re-establish the optimal tension conditions in order to properly apply the next labels in sequence. Thus, the backing liner 127 is stretched in the forward direction by a tensing assembly 120 shown, in FIG. 12 and FIG. 21. A motor-driven roller 215 is rotated in the clockwise direction, whereby the liner 127 is stretched. This causes the roller 128 to pivot around the pivotable joint 145, whereby the nip between roller 128 and roller 125 is released. Any slack in the liner 127 up to the printer head 124 is removed by this stretching action. The printer head 124 blocks the liner, which is then stretched over the peeling edge. The pivotal movement of the roller 128 around joint 145 can in addition aid in releasing an object, which might have gotten stuck in the peeling assembly.

Figure 19:
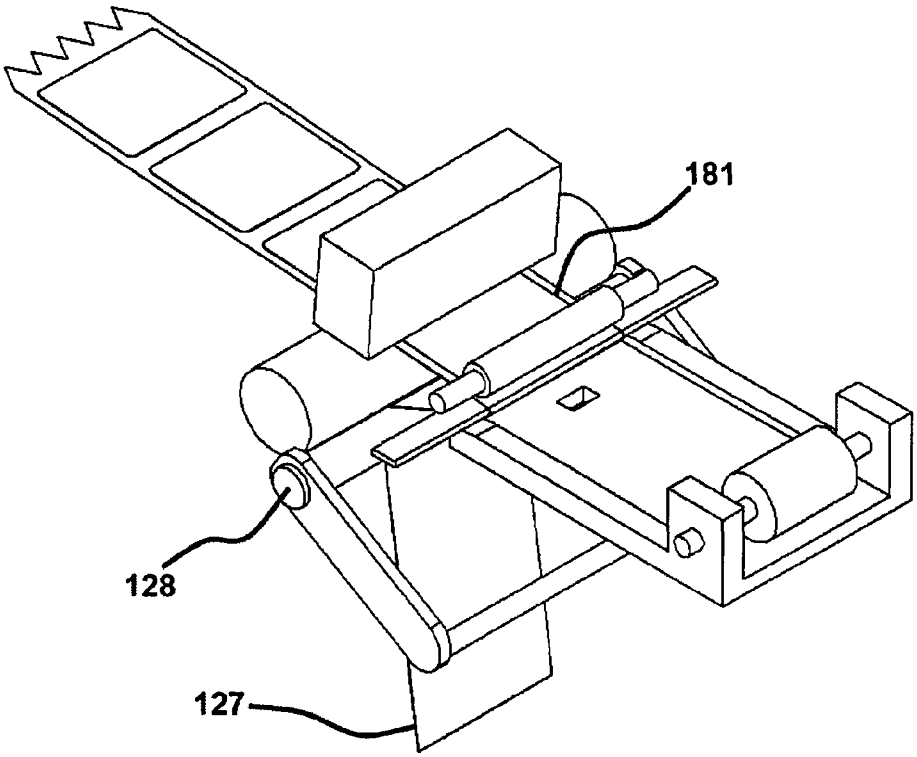
FIG. 19 is a detail view similar to FIG. 13 in a sixth position.

In FIG. 19, the roller 215 is rotated in the counter-clockwise direction, which means that the roller 128 resumes its position and the nip between roller 128 and 125 is restored. A spring (not shown) could be used to push the roller arm 146 back in its starting position. In addition, the roller 128 continues to rotate in the anti-clockwise direction for forming a slack in the liner 127 between the roller 128 and the roller 215. Such a slack makes it possible to perform a back-feed without activating the roller 215. The next label in sequence 181 is ready to be back-feeded and printed and applied to the next object.

The sequence of operation steps can be arranged in different orders. For example, the back-feed step can be performed as the last step, so that the label is in correct position for printing in the idle position of the printer. In this case, a labeling procedure will be the following. An order to print a label is given by a computer to the printer, together with the information to be printed on the label. The printer sends a signal to the motor driving the storage roller, such as roller 51 and the feed roller, such as roller 131 to advance an object to a labeling position. When indicator 142 indicates to the printer that an object is in a labeling position, the printer prints the label and advances the label 143 to the peeling edge 126. When the right end of the label is at the peeling edge, the roller 131 is rotated in the counter-clockwise direction, and the object is advanced to the right at the same speed as the label is advanced to the right by rollers 125 and 128. Now, the label is attached to the object in the correct position. The object is removed from the printer and the roller 125 is stopped. Roller 215 is operated in the clock-wise direction in order to stretch the liner 127, resulting in that the roller 128 is pivoted to the right to loosen its nip and to expel any object that may have been stuck. The liner is stretched all the way up to the printer head. Then, the roller 215 is operated in the clock-wise direction, resulting in that the roller 128 resumes its nip (by means of the spring), and that a slack is generated in the liner 127 until sensor 214 indicates that the slack is sufficient. Finally, a back-feed is performed for arranging the next label in correct printing position and arranging the printer in an idle position waiting for the next label to be printed. In this sequence of operations, the printer computer controls the labeling device. A computer arranged to deliver information to be printed is connected directly to the printer only.

Another sequence of operation steps may be that the printer prints the label and advances it to the peeling edge before or at the same time as the object is advanced from the storage to the labeling position. This may save time. Thus, the printer prints the label and advances it to the peeling position and awaits a signal from the indicator 142 until the label is further advanced over the peeling edge to the object. If the signal from the indicator 142 has been received before the printing step is ready, the label does not stop at the peeling edge but is continually advanced from printing and over the peeling edge.

If several labels are printed in a batch, a back-feed of the liner 127 may not be required between each labeling step, but a second label is printed while the first label is being attached to the object. However, a back-feed between each application of a label is preferred, because a better control of each labeling sequence may be obtained. This is particularly the case if the labels are arranged close to each other at the liner.

It may not be necessary to have a slack of the liner 127 as indicated by sensor 214. Instead, the roller 215 may be rotated in the counter-clockwise direction synchronous with the back-feed by roller 125. However, the tension of the liner 127 after the roller 128 must not be large, so that the nip between roller 128 and roller 125 is maintained.

It is also possible to print and apply several labels in a row, when the label is in a correct position in the case, wherein information for several labels has been provided to the printer, for example in a batch. In this case, after a label has been printed and it has been applied on the object, all the printer processes will be stopped until the next object is in labeling position.

Figure 20:
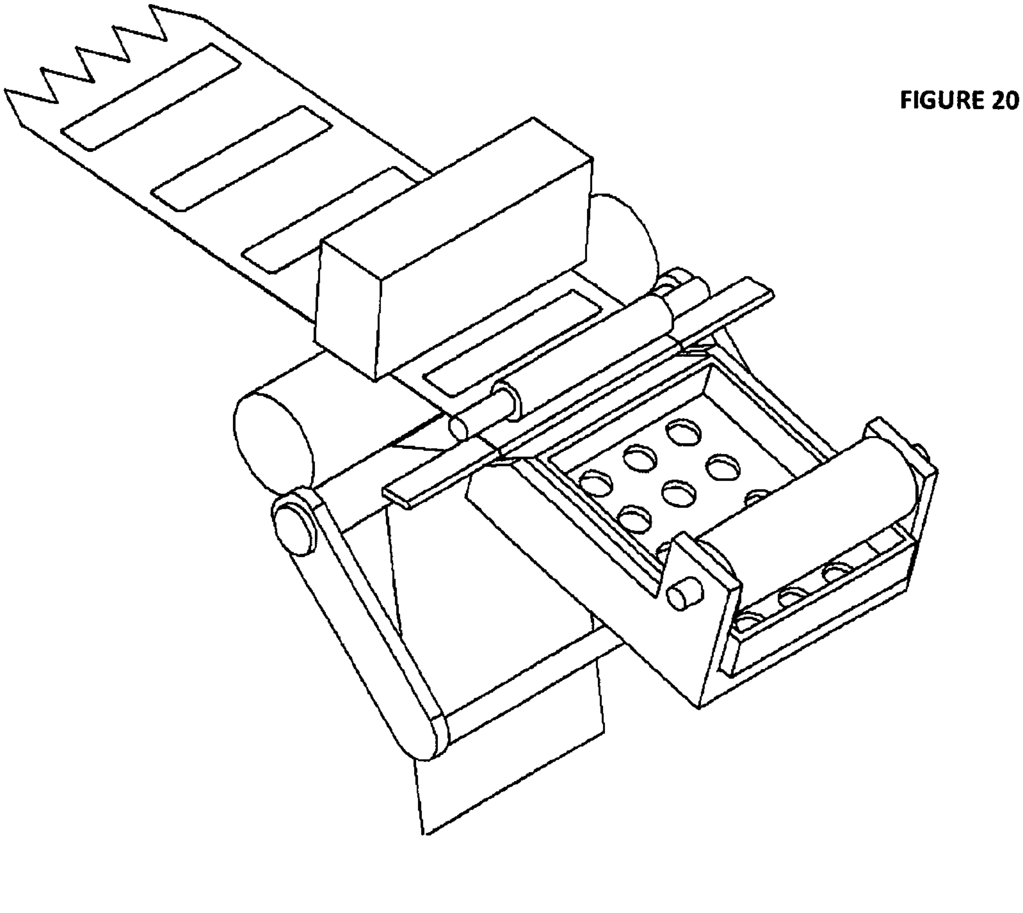
FIG. 20 is a detail view similar to FIG. 13 for labeling another type of object.

FIG. 20 shows the peeling and application assembly in which the object is a tissue cassette. In this case, the backing plate has another inclination in order to arrange the label on an inclined surface of the tissue cassette. The distance between labels for the cassette is larger than the distance between labels for the slide. In fact, a smaller label is more difficult to peel and, in order to print a batch of labels at demand, the printer needs to have enough space to be able to run a back-feed. For these reasons a general restriction of the peeler-kits, which are sold around the world is that the length dimension of the label to be peeled (along the feed direction) must be larger than 1 inch (25.4 mm).

Figure 21:
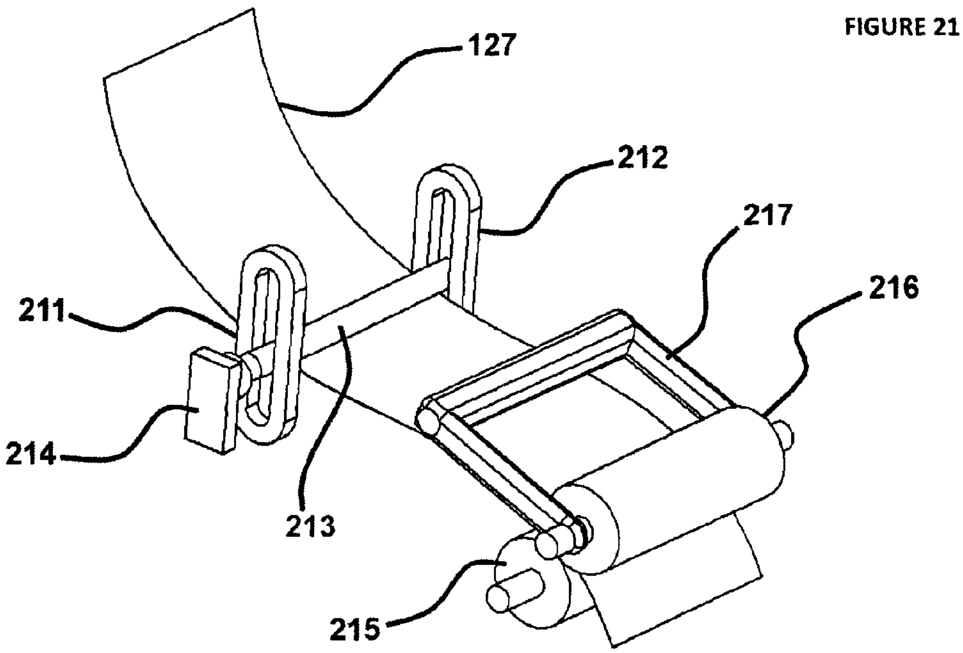
FIG. 21 is a detail view similar to FIG. 12 showing slack adjustment.

In FIG. 21 there is shown the tensing assembly. The liner 127 passes through two rollers 215 and 216 where the topmost is mounted on a movable arm 217 to allow an easy removal and insertion of the liner. The arm 217 may be urged towards the position shown in FIG. 21 by a spring (not shown). A bar 213 can freely move up and down within the space constrained by the two guides 211 and 212. The liner 127 passes under the bar 213 which is moved up when the liner is stretched and moved forward by the two rollers 215 and 216. The sensor 214 detects the position of the bar, thus indicating when the liner is in tension. When the liner is not in tension, the bar 213 returns to the bottom position due to its weight.

Figure 22:
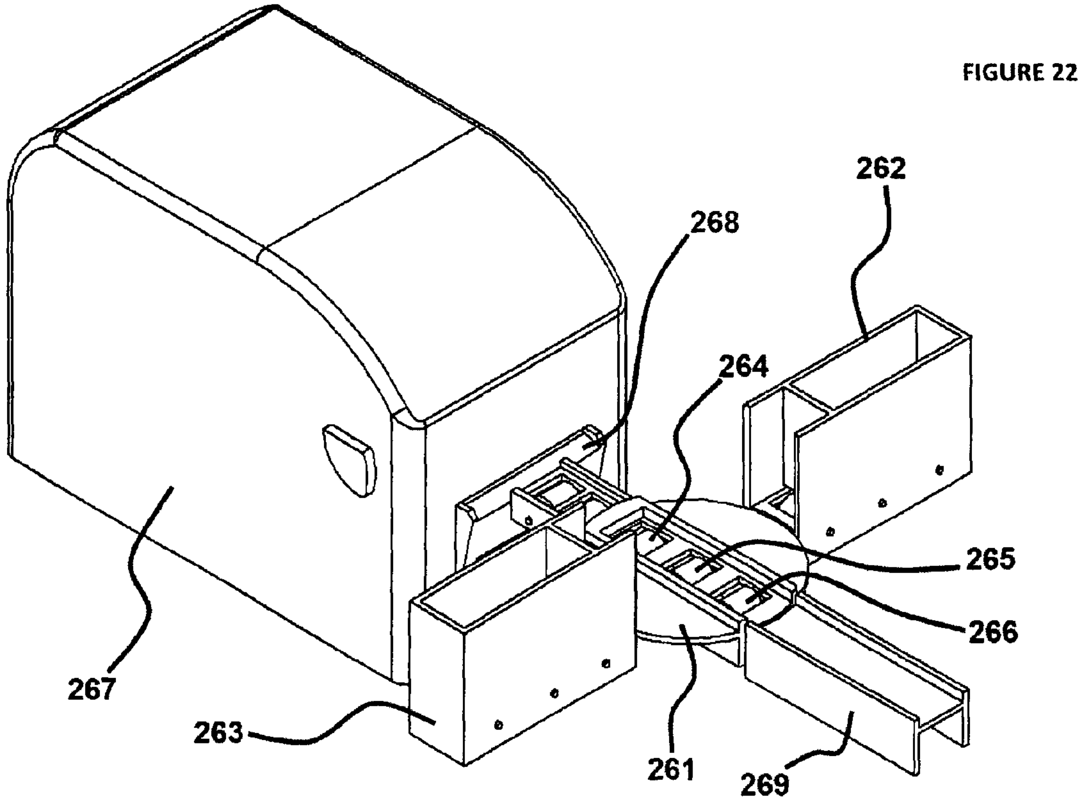
FIG. 22 is a schematic view similar to FIG. 1 of another embodiment of the labeling device.

In FIG. 22, there is shown the apparatus in another configuration, which makes use of a rotating plate 261 and one or several storage containers 262, 263. The rotating plate is provided with several rollers 264, 265, 266 as shown. The rotating plate 261 is rotated in such a way that the object being released from the storage container 262 can enter into the track of the rotating plate. Then the rotating plate 261 rotates in such a way that the object on its top can be further transported into the label applicator 268, which is in proximity with the printer 267. The object is labeled and then it is transported out through the releasing assembly 269. After the object is released the rotating plate 261 can return to the feeding position.

Figure 23:
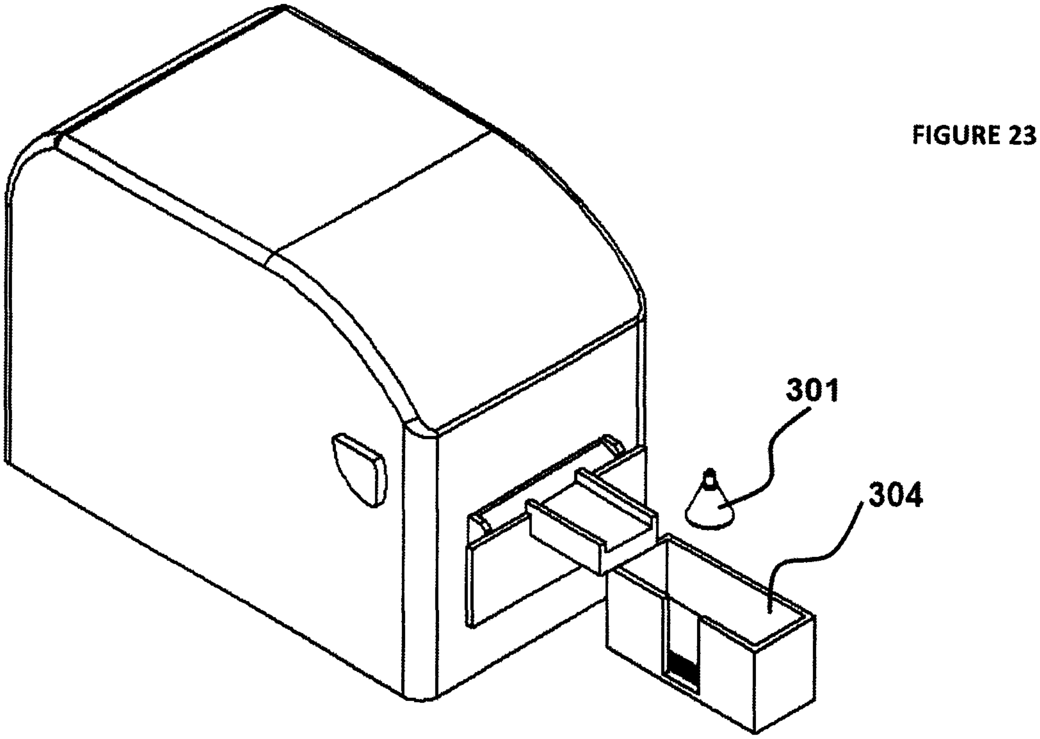
FIG. 23 is a schematic view similar to FIG. 1 of a further embodiment of the labeling device.

In FIG. 23 there is shown the apparatus in a configuration, which makes use of a suction pad 301 on a movable arm (not shown), which can take an object from the storage container 304 and transport it in the application position. The suction pad 301 is then moved down in the storage container 304 until it reaches the first object. The object is transported into the application position and it is labeled, following the method described before.

Figure 24:
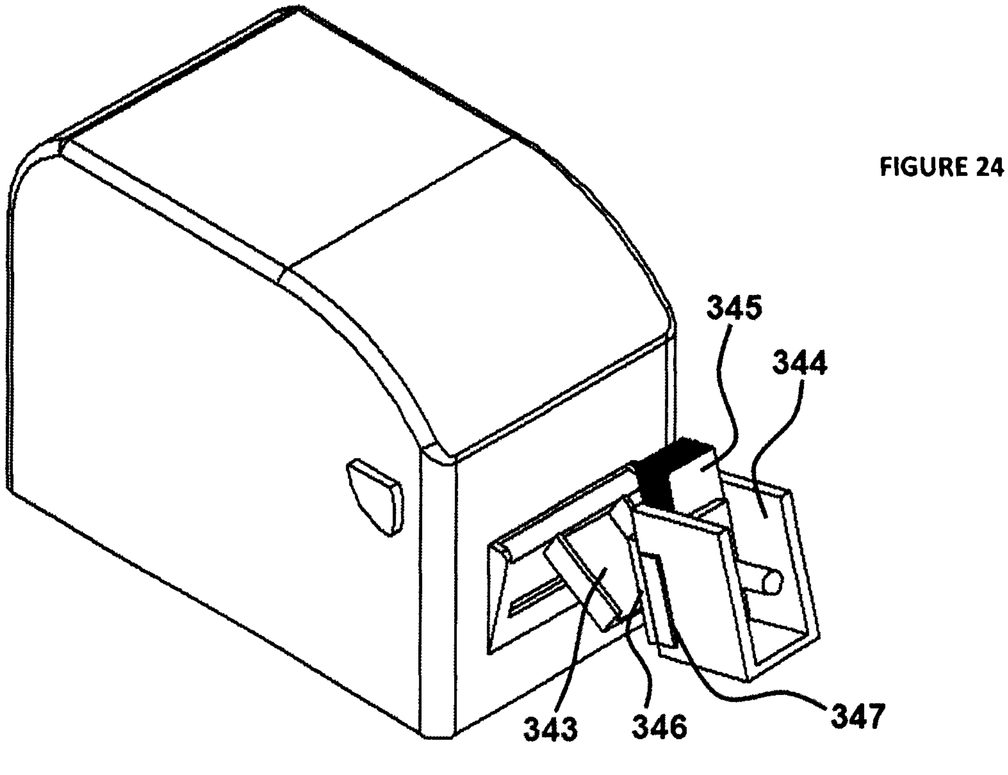
FIG. 24 is a schematic view similar to FIG. 1 of a yet further embodiment of the labeling device.

In FIG. 24 there is shown the apparatus in a configuration, which makes use of a special constructed storage container 344, in which the objects 345 are placed almost vertically in respect to the base plane. The storage container 344 has a front wall, which prevents the stack of objects from being released. A clamping arm 347 allows clamping the stack, while a movable arm 346 is used to push the stack forward. The arm 346 pushes the whole stack 345 against the front wall. The clamping arm 347 blocks the objects in the stack except for the first object, which is allowed to fall after the frontal wall has been removed. The object 345 falls on a movable ramp 343 in application position, where it is labeled. Then the movable ramp 343 changes the inclination in order to release the object.

Figure 25:
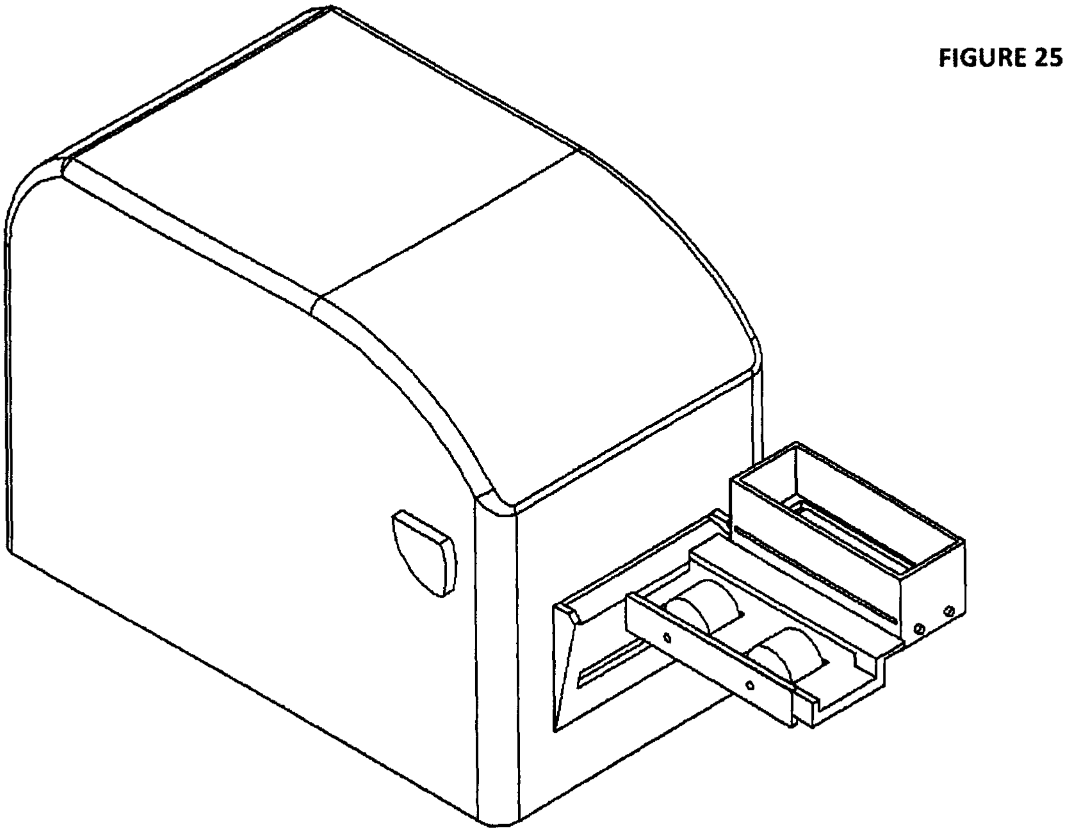
FIG. 25 is a schematic view similar to FIG. 1 of a still further embodiment of the labeling device.

In FIG. 25 there is shown the apparatus with a variation of the configuration according to FIG. 1. The storage container feeds the objects from the side instead from the front. The storage container can be built used the methods described before, using rollers, a band or a movable arm. The ramp has a bottom part and top part. Both parts can be movable in order to accommodate the object after this has been fed. After the object is placed in the ramp, it is moved forward in application position and labeled. The object is then released. The same modification with the storage container with side opening can be used for the apparatus in other configurations.

Figure 26:
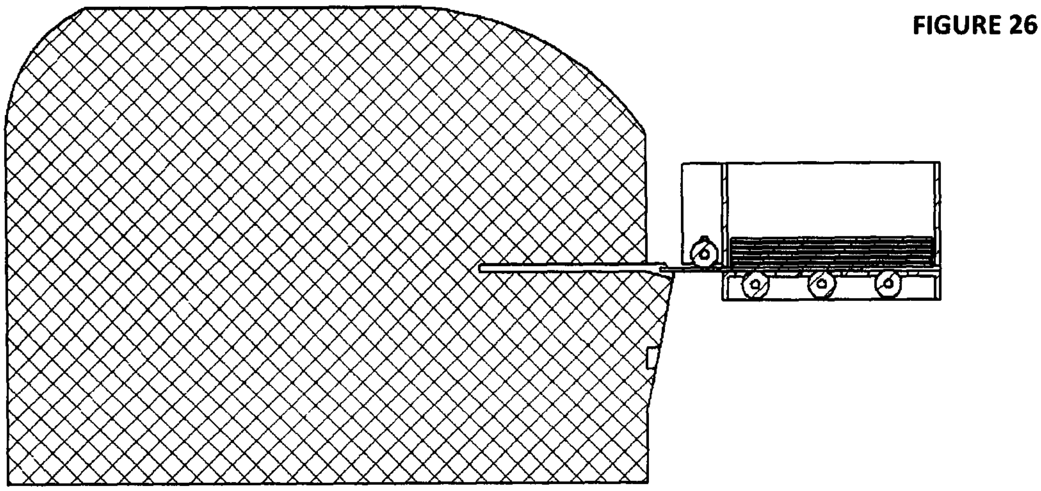
FIG. 26 is a schematic cross-sectional view of the embodiment according to FIG. 25.

In FIG. 26 there is shown the apparatus using a special storage container of the type described in FIGS. 8, 9 and 10. In this configuration the object can be released by the storage container after being labeled, with no need of any other part.

In the claims, the term "comprises/comprising" does not exclude the presence of other elements or steps. Furthermore, although individually listed, a plurality of means, elements or method steps may be implemented by e.g. a single unit. Additionally, although individual features may be included in different claims or embodiments, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

Although the present invention has been described above with reference to specific embodiment and experiments, it is not intended to be limited to the specific form set forth herein. Rather, the invention is limited only by the accompanying claims and, other embodiments than those specified above are equally possible within the scope of these appended claims.

The invention claimed is:

1. A method of application of a label to an object, comprising:

moving the object from a storing position to a labeling position by a first actuator driven by a motor;

transporting a first non-printed label of a series of labels arranged on a continuous liner into a printing position by back-feeding the label in a first direction toward a label printer and away from the object;

printing the label;

advancing the printed label in a second direction opposite the first direction and toward the object;

moving the liner across a peeling edge by a second actuator driven by a motor to peel the printed label off of the liner;

moving the object below the peeling edge and synchronous with the liner by the first actuator, whereby the relative speed of the object and the label being peeled off from the liner is-substantially zero in order to transfer the label from the liner to the object; and removing the object from the labeling position to a removal position.

2. The method according to claim 1, wherein the step of moving the object from the storing position to the labeling position is performed during or after the printing of the label.

3. The method according to claim 1, further comprising:

sensing that the object to be labeled is positioned in the labeling position before the printing and peeling steps.

4. The method according to claim 1, further comprising:

sending data to be printed on one or several labels to a memory of a label printer before the printing step.

5. The method according to claim 1, wherein the back-feeding step is performed during or after removal of the object.

6. The method according to claim 1, wherein the continuous liner is stretched before or after the printing step.

7. The method according to claim 6, wherein the stretching of the liner results in removal of the object.

8. A device for application of a label to object, comprising:

a storage for enclosing several objects to be labeled;

a transport device comprising a first actuator driven by a motor for moving each object from a storing position to a labeling position;

a label printer arranged to back-feed and print information on a label arranged on a continuous liner;

a feeding device comprising a second actuator driven by a motor in two directions, a first direction for feeding the liner across a peeling edge to peel the label off of the liner and an opposite second direction for back-feeding the liner to move a label into printing position;

wherein the transport device is arranged to move the object below the peeling edge and synchronous with the liner, so that the relative speed of the object and the label being peeled off from the liner is-substantially zero in order to transfer the label from the liner to the object; and a removal device for removing the labeled object from the label position to a removal position.

9. The device according to claim 8, further comprising:

a sensor arranged to determine when an object is positioned in a correct position for receiving a label when peeled off from the liner.

10. The device according to claim 8, wherein the first actuator comprises:

several rollers or a transport band or a movable arm arranged to interfere with a single object at a time, in order to transport the single object to the labeling position.

11. The device according to claim 8, further comprising a roller which is arranged to transport the object and at the same time exert pressure on the label attached to the object in order to further attach the label to the object.

12. The device according to claim 8, wherein said object is a microscope slide or a cassette.

13. The device according to claim 8, further comprising a guide arranged above the peeling edge so that the liner with attached label is arranged to pass between the guide and the peeling edge.

14. The device according to claim 8, further comprising a stretching device including at least one roller driven by a motor and arranged to act upon the liner after the peeling edge to stretch the liner.

15. The device according to claim 14, wherein a roller is arranged on a pivotable arm and arranged to be pivoted during said stretching of the liner in order to push out an object.

16. The device according to claim 8, further comprising:

a storage for the continuous liner provided with labels; and an object device including:

a sensor device for sensing when an object from the several objects to be labeled is in a correct labeling position, and a stretching device for stretching the liner after the label is peeled off the peeling edge;

wherein the second actuator is a roller driven by a motor for feeding the liner and label to the label printer for printing information on the label and for feeding the liner and label to the peeling edge to peel the label off of the liner.

17. The device according to claim 16, wherein the printer comprises a first control device for operating the printer and wherein the object device comprises a second control device for operating the object device, which second control device is controlled by the first control device, and wherein information for printing a label is only delivered to the first control device.

18. The device according to claim 17, wherein the information is sent to the first control device by a barcode reader, an electronic scale or a personal computer.

19. The device according to claim 17, wherein said second control device is arranged to command the said first control device to issue one single label at a time.

20. The method according to claim 1, further comprising transferring the label onto a flat surface of the object.

* * * * *